United States Patent [19]
Bruer et al.

[11] 3,855,211
[45] Dec. 17, 1974

[54] DITHIOCARBONYLAMINOACETYL CEPHALOSPORINS

[75] Inventors: Hermann Bruer, Burgweinting; Uwe D. Treuner, Regensburg, both of Germany

[73] Assignee: E. R. Squibb & Sons, Inc., Princeton, N.J.

[22] Filed: June 9, 1972

[21] Appl. No.: 261,195

[52] U.S. Cl. .............................. 260/243 C, 424/246
[51] Int. Cl. ............................................. C07d 99/24
[58] Field of Search ................................. 260/243 C

[56] References Cited
UNITED STATES PATENTS
3,646,024   2/1972   Holdrege ..................... 260/243 C
3,687,949   8/1972   Holdrege ..................... 260/243 C

*Primary Examiner*—Nicholas S. Rizzo
*Attorney, Agent, or Firm*—Lawrence S. Levinson; Merle J. Smith

[57] ABSTRACT

Dithiocarbonylaminoacetylcephalosporins of the general formula

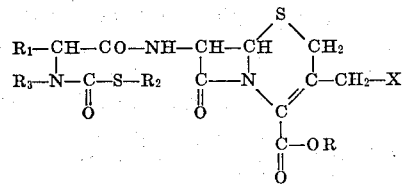

wherein R is hydrogen, lower alkyl, aralkyl, a salt forming ion or the group

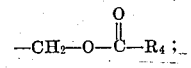

$R_1$ is hydrogen, lower alkyl, lower alkenyl, cycloalkyl, cycloalkenyl, cyclo-lower alkadienyl, aralkyl, aryl or certain heterocyclic groups; $R_2$ is lower alkyl, aryl or aralkyl; $R_3$ is hydrogen, lower alkyl or aryl; $R_4$ is lower alkyl, aryl or aralkyl; and X is hydrogen, hydroxy, lower alkanoyloxy, aroyloxy, aralkanoyloxy, lower alkylthio, lower alkoxy, the radical of a nitrogen base, a quaternary ammonium radical, or together X and R represent a bond linking carbon and oxygen in a lactone ring; are useful as antibacterial agents.

10 Claims, No Drawings

DITHIOCARBONYLAMINOACETYL CEPHALOSPORINS

SUMMARY OF THE INVENTION

This invention relates to new dithiocarbonylaminoacetylcephalosporins of the formula

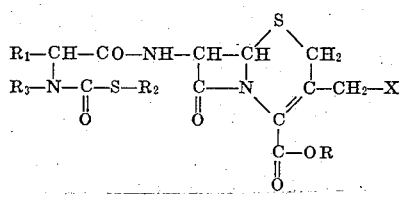

R represents hydrogen, lower alkyl, aralkyl, a salt forming ion or the group

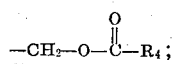

$R_1$ represents hydrogen, lower alkyl, lower alkenyl, cyclo-lower alkyl, cyclo-lower alkenyl, cyclo-lower alkadienyl, aryl, aralkyl or certain heterocyclic groups; $R_2$ represents hydrogen, lower alkyl or aryl; $R_4$ represents lower alkyl, aryl or aralkyl; X is hydrogen, hydroxy, lower alkanoyloxy, aroyloxy, aralkanoyloxy, lower alkylthio, lower alkoxy, the radical of a nitrogen base, a quaternary ammonium radical, or together X and R represent a bond linking carbon and oxygen in a lactone ring.

The preferred members within each group are as follows: R is hydrogen, lower alkyl, alkali metal or

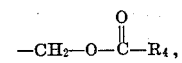

especially hydrogen, methyl, pivaloyloxy, sodium or potassium; $R_1$ is hydrogen, lower alkyl, phenyl, thienyl, furyl, oxazolyl, isoxazolyl or thiazolyl, especially phenyl; $R_2$ is lower alkyl, especially methyl or ethyl; $R_3$ is hydrogen or lower alkyl, especially ethyl; $R_4$ is lower alkyl, preferably methyl or t-butyl and X is preferably hydrogen or acetoxy.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to eight carbons in the chain, for example, methyl, ethyl, propyl, isopropyl, butyl, isobutyl, t-butyl, amyl or the like.

The aryl groups are monocyclic carbocyclic aryl groups including simply substituted members. By way of illustration, this includes the phenyl ring and simply substituted phenyl containing one to three substituents (preferably only one) such as the halogens (chlorine and bromine being preferred), lower alkyl groups such as those defined above, lower alkoxy groups, (i.e., lower alkyl groups of the type defined above attached to an oxygen), hydroxy, carboxy and the like. In the case of the last two named substituents there is preferably only one, especially in the para position of the phenyl. Illustrative are phenyl, o—, m— and p-chlorophenyl, o—, m— and p-bromophenyl, 3,4-dichlorophenyl, 3,5-dibromophenyl, o—, m— and p-tolyl, p-methoxyphenyl, 3,4,5-trimethoxyphenyl, p-hydroxyphenyl, p-carboxyphenyl and the like.

The aralkyl groups include a monocyclic carbocyclic aryl group attached to a lower alkyl group, both as defined above. Illustrative are benzyl, o—, m— or p-chlorobenzyl, o—, m— or p-bromobenzyl, o—, m— or p-methylbenzyl, phenethyl, p-chlorophenethyl, 3,5-diethylbenzyl, 3,4,5-trichlorobenzyl and the like.

The lower alkanoyloxy, aroyloxy and aralkanoyloxy groups represented by X include the acyl group of acid esters. The lower alkanoyl radicals are the acyl radicals of lower fatty acids containing alkyl radicals of the type described above. The lower alkanoyloxy groups include, for example, acetoxy, propionyloxy, butyryloxy and the like. The aroyloxy groups are derived from monocyclic carbocyclic aryl groups of the kind described. Similarly the aralkanoyloxy groups consist of monocyclic carbocyclic aryl and alkanoyloxy radicals of the type described. X also represents the radical of an amine, e.g., an alkylamine like methylamine, ethylamine, dimethylamine, triethylamine, aralkylamine like dibenzylamine, N,N'-dibenzylpyridinium, pyridinium, 1-quinolinium, 1-picolinium, etc. X and R may also join together, as indicated above, to form a bond linking carbon and oxygen in a lactone ring.

The cyclo-lower alkyl groups are the alicyclics of three to seven carbon atoms, e.g., cyclopropyl, cyclobutyl, cyclopentyl, cyclohexyl and cycloheptyl; cyclopentyl and cyclohexyl are preferred. The cyclo-lower alkenyl groups are the 4 to 6 carbons monounsaturated cyclic groups including cyclobutene, cyclopentene and cyclohexene. The cyclo-lower alkadiene groups are similar cyclic groups which have two double bonds, particularly cyclohexadienyl and especially 1,4-cyclohexadienyl.

The heterocyclic groups represented by $R_1$ are 5- to 6-membered monocyclic heterocyclic radicals (exclusive of hydrogen), including thienyl, furyl, oxazolyl, isoxazolyl and thiazolyl, as well as these heterocyclics with the substituents halo, lower alkyl (particularly methyl and ethyl), lower alkoxy (particularly methoxy and ethoxy) or phenyl.

The salt forming ions represented by R and $R_2$ may be metal ions, e.g., aluminum, alkali metal ions such as sodium or potassium, alkaline earth metal ions such as calcium or magnesium, or an amine salt ion, of which a number are known for this purpose, for example, dibenzylamine, N,N-dibenzylethylenediamine, methylamine, triethylamine, procaine, N-ethylpiperidine, etc.

The new dithiocarbonylaminoacetylcephalosporins of this invention are produced by reacting a 7-aminocephalosporanic acid compound of formula II [which includes especially 7-amino-cephalosporanic acid (7-ACA), 7-amino-3-desacetoxycephalosporanic acid (7-ADCA) and as well as other derivatives] of the formula (II)

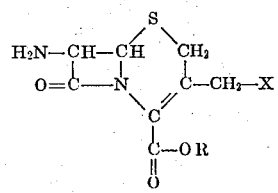

with a dithiocarbonylaminoacetic acid of the formula (III)

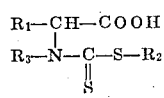

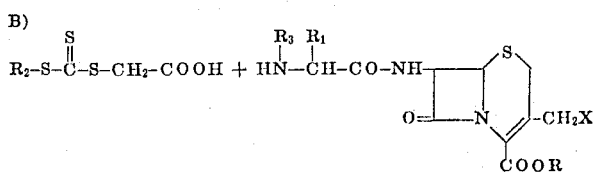

or an activated derivative of the former (II). The symbols have the meanings already defined.

The activated derivatives refered to include, for example, the reaction product with an anhydride forming reagent such as ethylchloroformate, benzoyl chloride, pivaloyl chloride, etc., or with bis-imidazolecarbonyl, dicyclohexylcarbodiimide, p-nitrophenol or the like.

The reaction between 7-aminocephalosporanic acid compound and the dithiocarbonylthioacetic acid may be effected, for example, by dissolving or suspending the latter in an inert organic solvent such as chloroform, methylene chloride, dioxane, benzene or the like, and adding, at about room temperature or below, about an equimolar amount of an anhydride forming reagent, e.g., ethyl chloroformate, benzoylchloride or the like, or other activating compound such as dicyclohexylcarbodiimide, along with a salt forming organic base, such as triethylamine, pyridine or the like, followed, after an interval, by the addition of the 7-aminocephalosporanic acid compound. The product of the reaction is then isolated by conventional procedures, e.g., by concentration or evaporation of the solvent.

When R is the acyloxymethyl group

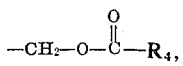

this group may be introduced into the 7-aminocephalosporanic acid moiety prior to the reaction with the dithiocarbonylthioacetic acid or the activated derivative by treatment with one to two moles of a halomethyl ester of the formula (IV)

wherein hal is halogen, preferably chlorine or bromine, in an inert organic solvent such as dimethylformamide, acetone, dioxane, benzene or the like, at about ambient temperature or below.

Alternate methods of synthesis are shown by the following flow schemes:

A)

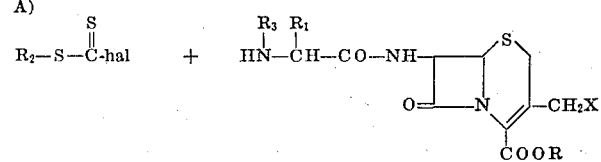

| inert solvent like CH₂Cl₂ tetrahydrofuran ethylacetate etc. | preferably in the presence of a base like sodium hydroxide or triethylamine temp. −20° C. to room temp. |

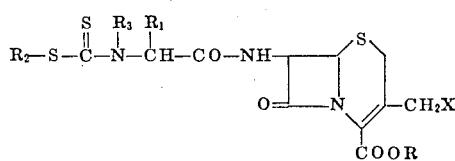

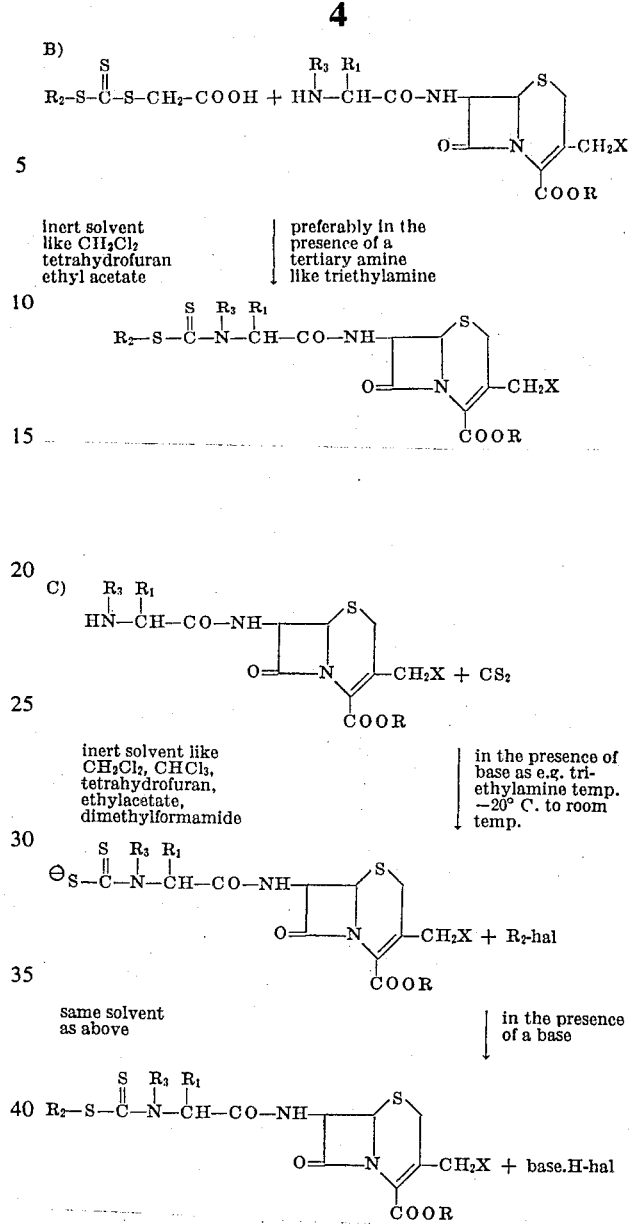

The following reaction schemes describe how to prepare the starting materials by the methods described in the literature cited:

1. 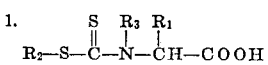

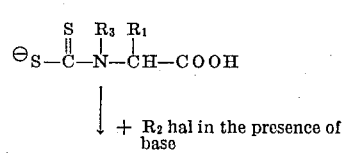

(See J. Chem. Soc. *1948*, p. 1058)

2. 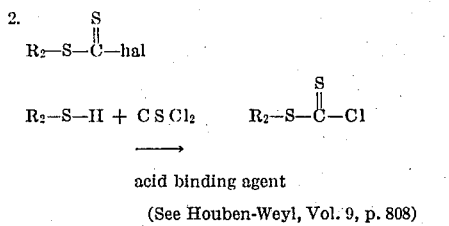

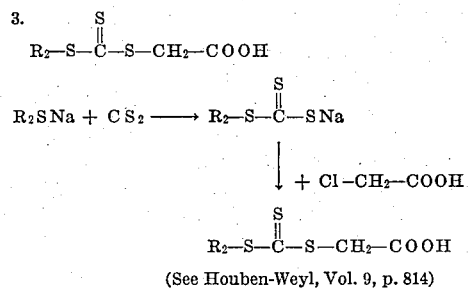

Further process details are also provided in the illustrative examples.

Certain of the compounds of this invention may exist in different optically active forms. The various stereoisomeric forms as well as the racemic mixtures are within the scope of the invention.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes*. They may be used an antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of formula I or a physiologically acceptable salt thereof may be used in various animal species in an amount of about 1 to 200 mg./kg., daily, orally or parenterally, in single or two to four divided doses to treat infections of bacterial origin, e.g., 5.0 mg./kg. in mice.

Up to about 600 mg. of a compound of formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.01 to 1 percent by weight of such compounds admixed with, suspended or dissolved in conventional inert dry or aqueous carriers for application by washing or spraying. They are also useful as nutritional supplements in animal feeds.

The following examples are illustrative of the invention. All temperatures are on the centigrade scale. Additional variations may be produced in the same manner by appropriate substitution in the starting material.

EXAMPLE 1

6.94 grams (0.002 mol.) of D-7-($\alpha$-aminophenylacetamido)-3-desacetoxycephalosporanic acid are suspended in 200 ml. of methylene chloride. 7 ml. (approx. 0.05 mol.) of triethylamine are added and after 10 minutes a clear solution is obtained. Then 1.6 gms. (0.021 mols.) of carbon disulfide are added and the solution is stirred for 3 hours at room temperature. 4.36 gms. (0.04 moles) of ethyl bromide are then added and the mixture is stirred for an additional 2 hours at room temperature.

The solution is evaporated to dryness in the rotary evaporator at room temperature, the residue is dissolved in 200 ml. of water, filtered and the filtrate is acidified to pH 1 with 2 N hydrochloric acid. The precipitate is filtered under suction, washed with water and suspended in 200 ml. of water. The suspension, while cooling with ice, is brought into the solution by the addition of triethylamine and the product is reprecipitated by the addition of 2N hydrochloric acid. The yield of product, 7-[D-2-[[(ethylthio)thiocarbonyl]-amino]-2-phenylacetamido]-3-desacetoxycephalosporanic acid, amounts to 2.8 gms., m.p. about 130° (dec.).

The potassium salt is prepared by dissolving 1.8 gms. of the product of the preceding part in 20 ml. of methanol, the slightly turbid solution is filtered, treated with 2 ml. of a 2N solution of potassium ethyl hexanoate and then precipitated with a large amount of ether. The potassium salt of 7-[D-2-[[(ethylthio)thiocarbonyl]amino]-2-phenylacetamido]-3-desacetoxycephalosporanic acid, yield 1.5 gms., m.p. about 200° (dec.).

EXAMPLE 2

2.21 gms. (0.005 mol.) of 7-(2-aminoacetamido)-cephalosporanic acid trifluoroacetate are suspended in 25 ml. of methylene chloride; this is cooled to 0° to 5°, then 2.8 ml. (0.02 mols.) of triethylamine and 0.53 gms. (0.007 mols.) of carbon disulfide are added. The solution is stirred at 0° to 5° over a total of 3 hours. After about 1 ½ hours, a clear solution results. After the 3 hours, 1.1 gm. (0.007 mols.) of ethyl iodide are added and this is stirred for an additional 3 hours at 0° to 5°. The mixture is concentrated at room temperature in a rotary evaporator, the residue is taken up in about 30 ml. of water and extracted with 2 × 10 ml. of ethyl acetate. The aqueous phase is layered with fresh ethyl acetate, cooled to 0° to 5° and acidified with 2N hydrochloric acid. The layers are separated, the aqueous layer is extracted several times with ethyl acetate. The combined ethyl acetate extracts are washed three times with water, dried with magnesium sulfate, treated with activated carbon, filtered and the filtrate is concentrated to 20 ml. The product 7-[2-[[(ethylthio)thiocarbonyl]amino]acetamido]cephalosporanic acid is precipitated from the solution by the addition of petroleum ether, yield 0.5 gms., m.p. about 103° (dec.).

EXAMPLE 3

The mixed anhydride is formed from 1.93 gms. of [[-(ethylthio)thiocarbonyl]methylamino]acetic acid, 1.4 ml. of triethylamine and 1.34 ml. of isobutyl chloroformate in 40 ml. of absolute tetrahydrofuran at −30°. A solution of 2.72 gms. of 7-aminocephalosporanic acid and 1.4 ml. of triethylamine in 40 ml. of 50 percent tetrahydrofuran formed at 0° is added to the mixture. The mixture thus obtained is stirred for 40 minutes at 0 to 5° and 40 minutes at room temperature. This is concentrated at room temperature in a rotary evaporator and the residue is treated with 80 ml. of water. The aqueous solution is extracted with ethyl acetate. The layers are separated, the aqueous phase is layered over with ethyl acetate, cooled to 0° to 5° and acidified with 2N hydrochloric acid to pH 2. The layers are separated and the aqueous phase is extracted several times with ethyl acetate. The combined ethyl acetate extracts are washed three times with water, dried with magnesium sulfate, decolorized with activated carbon and concentrated to a volume of 30 ml. By the addition of petroleum ether 7-[2-[[(ethylthio)thiocarbonyl]methylamino]-acetamido]cephalosporanic acid precipitates, yield 1.6 gms., m.p. below 132° (dec.). The compound crystallizes with 1 mol. of ethyl acetate.

1.2 gms. of the acid obtained in the preceding part are dissolved in 20 ml. of methanol and treated with 1.5 ml. of 2N potassium ethyl hexanoate solution. Slowly fine crystals begin to separate. The mixture is stirred for 1 hour at room temperature and then permitted to stand in the refrigerator for an additional hour. This is then filtered under suction and the crystals are washed with a little cold methanol. There are obtained 0.8 gms. of the potassium salt of 7-[2-[[(ethylthio)thiocarbonyl]methylamino]acetamido]-cephalosporanic acid, m.p. 144°(dec.). An additional amount of the product may be precipitated from the mother liquor by the addition of ether.

The following additional products having the formula (b) in the table are obtained by the procedure of Example 1 by substituting for the D-7-(α-aminophenylacetamido)-3-desacetoxycephalosporanic acid, the starting material (a), and for the ethyl bromide, the $R_2$-bromide with the substituents in the table:

TABLE

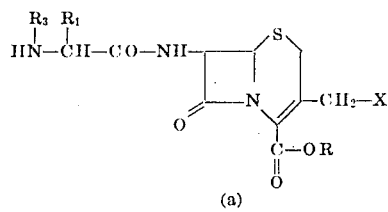
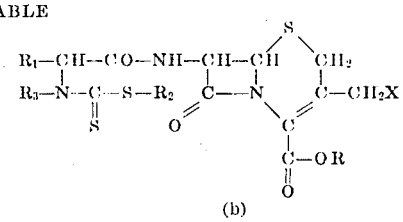

(a)     (b)

| Example | R | $R_1$ | $R_2$ | $R_3$ | X |
|---|---|---|---|---|---|
| 4 | $CH_3$ | H | $CH_3$ | H | H |
| 5 | K | $CH_3$ | $C_2H_5$ | H | OH |
| 6 | K | $C_3H_7$ | $C_2H_5$ | H | Pyridinium. |
| 7 | $-CH_2OC(O)-CH(CH_3)_2$ | $C_6H_5CH_2$ | $C_6H_5CH_2$ | $CH_3$ | $OCOCH_3$ |
| 8 | $-CH_2OC(O)-C_6H_5$ | $4-ClC_6H_4$ | $CH_3$ | $C_2H_5$ | $OCOCH_3$ |
| 9 | H | $3,4-(CH_3O)_2C_6H_3$ | $C_2H_5$ | H | H |
| 10 | K | $3,4,5-(CH_3O)_3C_6H_2$ | $C_2H_5$ | H | $OCOCH_3$ |
| 11 | Na | $4-CH_3C_6H_4$ | $C_2H_5$ | H | $OCOCH_3$ |
| 12 | Lactone (+X) | $3,4-(Br)_2C_6H_3CH_2$ | $C_2H_5$ | $C_2H_5$ | Lactone (+R). |
| 13 | H | $2,4-(Cl)_2C_6H_3$ | $C_2H_5$ | H | $OCOCH_3$ |
| 14 | H | $C_6H_5$-isoxazole-$CH_3$ | $C_2H_5$ | H | $OCOCH_3$ |
| 15 | Na | thienyl | $C_2H_5$ | $C_6H_5$ | $OCOCH_3$ |
| 16 | $C_6H_5CH_2$ | furyl | $C_6H_5CH_2$ | H | $OCOCH_2C_6H_5$ |
| 17 | $CH_2OC(O)-C(CH_3)_3$ | $C_6H_5$ | $C_6H_5$ | $C_6H_5$ | H |
| 18 | $CH_2O-C(O)-(CH_3)_3$ | $C_6H_5$ | $C_6H_5$ | $C_6H_5$ | $OOC-C_6H_5$ |
| 19 | H | $C_6H_5$ | $C_2H_5$ | $C_2H_5$ | H |
| 20 | Na | $C_6H_5$ | $C_2H_5$ | H | H |
| 21 | $CH_2O-C(O)-C(CH_3)_3$ | $C_6H_5$ | $C_2H_5$ | H | $OCOCH_3$ |
| 22 | $N(C_2H_5)_3$ | $C_6H_5$ | $C_2H_5$ | H | H |
| 23 | Na | $C_6H_5$ | $C_2H_5$ | H | $OCH_3$ |
| 24 | Na | $C_6H_5$ | $C_2H_5$ | H | $OCOCH_3$ |
| 25 | K | $CH_2=CH-$ | $C_2H_5$ | H | H |

Table — Continued

| Example | R | R₁ | R₂ | R₃ | X |
|---|---|---|---|---|---|
| 26 | H | (thienyl) | $C_6H_5CH_2$ | H | $SCH_3$ |
| 27 | K | (thienyl) | $C_2H_5$ | H | $OCOCH_3$ |
| 28 | K | (phenyl) | $C_2H_5$ | H | H |
| 29 | H | (phenyl) | $C_2H_5$ | H | H |

EXAMPLE 30

2.2 gms. (0.005 mols.) of D-7-(α-aminophenylacetamido)-cephalosporanic acid dihydrate are suspended in 50 ml. of methylene chloride. This is stirred at room temperature and 2.8 ml. (0.02 mol.) of triethylamine are added. After several minutes a clear solution is obtained. Then 0.76 gms. (0.01 mols.) of carbon disulfide are added and the mixture is stirred at room temperature for 3 hours.

The reaction mixture is then cooled to 0° and 2.84 gms. (0.02 mols.) of methyliodide are added. This is stirred for 2 hours at the same temperature. The reaction mixture is concentrated in vacuo in a rotary evaporator. The residue is taken up in 75 ml. of water, the solution is adjusted to pH 6.5 with triethylamine and shaken with ether. The aqueous phase is separated, cooled to 0° to 5° and acidified with 2N hydrochloric acid. The precipitate is filtered under suction, suspended in water, again brought into solution with triethylamine and precipitated with 2N hydrochloric acid. The yield amounts to 2.0 gms. of 7-[D-2-[[(methylthio)thiocarbonyl]-amino]-2-phenylacetamido]cephalosporanic acid, m.p. 140° (dec.).

The potassium salt of this product is prepared by dissolving 1.5 gms of the acid in 10 ml. of methanol, treating the solution with activated carbon, filtering and reacting with 2.2 ml. of a 2N solution of potassium ethyl hexanoate in n-butanol. A small amount of precipitate is filtered under suction. The potassium salt is precipitated from the filtrate by the addition of ether, yield 1.1 gm., m.p. about 200° (dec.).

What is claimed is:

1. A compound of the formula

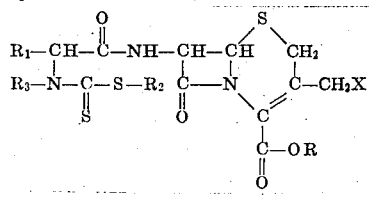

wherein R is hydrogen, lower alkyl,

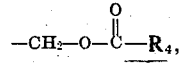

alkali metal, alkaline earth metal or triethylamine; $R_1$ is hydrogen, lower alkyl, cyclopentyl, cyclohexyl, cyclohexenyl, cyclohexadienyl, $R_5$-phenyl, thienyl or furyl; $R_2$ and $R_4$ each is lower alkyl, phenyl or phenyl-lower alkyl; $R_3$ is hydrogen, lower alkyl or phenyl; $R_5$ is hydrogen, halogen, lower alkyl or lower alkoxy; and X is hydrogen, hydroxy, lower alkanoyloxy, lower alkylthio or lower alkoxy.

2. A compound as in claim 1 wherein $R_1$ is phenyl.

3. A compound as in claim 2 wherein R and $R_3$ each is hydrogen and $R_2$ is lower alkyl.

4. A compound as in claim 3 wherein the lower alkyl group is ethyl.

5. A compound as in claim 4 wherein X is hydrogen.

6. A compound as in claim 4 wherein X is acetoxy.

7. A compound as in claim 1 wherein R is alkali metal, $R_1$ is phenyl, $R_2$ is ethyl and $R_3$ is hydrogen.

8. A compound as in claim 1 wherein R is hydrogen, lower alkyl, alkali-metal or

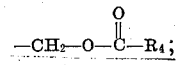

$R_1$ is hydrogen, lower alkyl, phenyl, thienyl, furyl, oxazolyl, isoxazolyl or thiazolyl; $R_2$ is lower alkyl; $R_3$ is hydrogen or lower alkyl; $R_4$ is lower alkyl and X is hydrogen or acetoxy.

9. A compound as in claim 1 wherein R, $R_1$ and $R_3$ each is hydrogen, $R_2$ is ethyl and X is acetoxy.

10. A compound as in claim 1 wherein R and $R_1$ each is hydrogen, $R_2$ is ethyl, $R_3$ is methyl and X is acetoxy.

* * * * *

UNITED STATES PATENT OFFICE
CERTIFICATE OF CORRECTION

PATENT NO. : 3,855,211
DATED : December 17, 1974
INVENTOR(S) : Hermann Breuer, Uwe D. Treuner It is certified that error appears in the above-identified patent and that said Letters Patent are hereby corrected as shown below:

On the title page the spelling of the inventor's name should be -- Hermann Breuer --
In the Abstract, the first formula and Column 1, first formula that portion of the formula reading

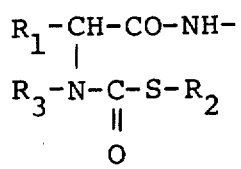    should read    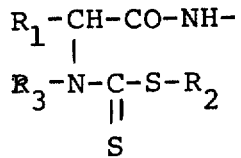

Signed and Sealed this

Twenty-sixth Day of October 1976

[SEAL]

Attest:

RUTH C. MASON
*Attesting Officer*

C. MARSHALL DANN
*Commissioner of Patents and Trademarks*